3,036,095
PROCESS FOR THE ALKYLATION OF DIHYDROXY-DIBENZANTHRONE WITH ALKYLENE DIHALIDES

William J. Moran, Martinsville, N.J., assignor to American Cyanamid Company, New York, N.Y., a corporation of Maine
No Drawing. Filed Sept. 1, 1959, Ser. No. 837,335
2 Claims. (Cl. 260—355)

This invention relates to an improvement in the alkylation of dihydroxydibenzanthrone with alkylene dihalides. More specifically, this invention relates to the improvement in the alkylation of dihydroxydibenzanthrone with lower alkylene dihalides by heating in an inert solvent above 130° in the presence of alkali metal carbonates which comprises including in the reaction mixture a catalytic amount of triethylamine.

Vat dyes which are derived from dihydroxydibenzanthrone are of very great commercial importance because of their desirable properties. The most important member of this class is Vat Jade Green, but a number of others are sold commercially. One of these others of specific importance to this invention is the dye known as Indanthrene Navy Blue G. Like the others of this class this dye is structurally an ether of dihydroxydibenzanthrone. In the manufacture of this type, the dihydroxydibenzanthrone is first prepared and this is then converted to the dyestuff proper by the action of the proper alkylating agent. This alkylation often proceeds more readily when the dihydroxydibenzanthrone is in the form of its alkali metal salts such as the sodium and potassium salts. The metal salt may be prepared and isolated and then converted to the ether but it is conveniently formed in situ in the reaction mixture by the action of an alkaline reagent followed, without isolation, by reaction with the alkylating agent. This is usually done commercially by heating a mixture of dihydroxydibenzanthrone press cake with potassium or sodium carbonate in the presence of a solvent such as nitrobenzene. The water which is present is then removed and the alkylation is then carried out by reaction with an alkylating agent such as an alkylene halide.

It was a disadvantage of the early processes for dyes of this type that the starting material, namely dihydroxydibenzanthrone, is unstable and easily oxidized to the corresponding diquinone. The latter material is a most undesirable contaminant in the final product since it reduces in the vat solution to the dihydroxy compound and the resulting dyeings are sensitive to alkali in erratic in color. It was a further disadvantage of early methods that because alkylation may be incomplete it became necessary to remove partially alkylated materials by treatment with alkaline reagents thus adding the further cost of an extra step.

One improvement in the process of preparing ethers of dihydroxydibenzanthrone was described by Von in U.S. Letters Patent No. 2,781,362. In the Von improvement, the dihydroxydibenzanthrone was placed in an inert solvent in a dispersed form by the manipulative expedient of adding a trialkyl amine such as triethyl amine to the suspension of the wet press cake of dibenzanthrone in the inert solvent. The acid binding agent, such as sodium carbonate, was then added and the water and amine were distilled off, leaving a fine dispersion of the alkali metal salt in the inert solvent. This improvement has been sufficient to permit an effective formation of the dimethyl ether of dibenzanthrone by the use of methylating agents such as dimethyl sulfate. This methyl ether is of course the well known Vat Jade Green. However, in the case of such dyes as the Navy Blue G in which the alkylating agent is a lower alkylene dihalide it has been found that the alkylation takes a very long time and never really goes to completion, even though the dihydroxydibenzanthrone has been previously treated in the manner described by Von. Consequently, there is still a need for an improved method of carrying out the actual alkylation reaction in such a manner that the reaction will go to completion, especially within a reasonable length of time.

In connection with the methylation of dihydroxydibenzanthrone to form Jade Green there has been a teaching in the past that certain aromatic and heterocyclic nitrogen compounds could be used in catalytic amounts to assist in the completion of the reaction. Among those suggested were aniline, methylaniline, pyridine, toluidines, and the like. However, when one tries these amines in the alkylation of dihydroxydibenzanthrone with a lower alkylene dihalide little or no improvement in the completeness of the alkylation or in the time required for alkylation is found.

I have found that a catalytic amount of triethyl amine in the alkylation reaction mixture when dihydroxydibenzanthrone is alkylated with a lower alkyl alkylene dihalide, amazingly, gives a complete alkylation in a relatively short time. This improvement is most unexpected in view of the failure of the aromatic amine catalysts of the Jade Green prior art to effect this catalysis. My invention can be used with or without the Von improvement in the preparation of dihydroxydibenzanthrone for alkylation. I however prefer to use dihydroxydibenzanthrone pretreated by the Von method.

It is important that my invention be distinguished from the Von improvement. Von's improvement lies in the preparation of dihydroxydibenzanthrone for alkylation by getting it in the form of its finely divided alkali salt suspended in a solvent. The amine that is added to the dihydroxydibenzanthrone slurry in the inert solvent is, in Von's improvement, completely removed as an azeotrope. To effect my invention a catalytic amount of triethylamine must then be readded, after such complete removal.

In the process of my invention, the dihydroxydibenzanthrone is used either as the wet cake or in a previously dried form. Preferably it is used as the wet cake. The dihydroxydibenzanthrone is slurried in an inert solvent such as nitrobenzene, orthodichlorobenzene, trichlorobenzene and the like. If the Von improvement is not used, it is still necessary to distill an azeotrope of water and the solvent in order to achieve a completely dry alkylation reaction mixture. When the Von improvement is used (which is preferable), an amine is added, followed by the alkali metal carbonate, and the water and amine are stripped off in the form of an azeotrope. However achieved, the suspension of alkali salt of dihydroxydibenzanthrone in dry inert solvent is then ready for the improvement of my invention. A small amount (from 1–10%) of triethylamine is then added, followed by the alkylene dihalide. The reaction mixture is then heated above 130° until alkylation is complete.

The alkylene dihalides used as alkylating agents include the generally available lower alkylene dihalides such as ethylene dichloride, ethylene dibromide, ethylene diiodide, propylene dichloride, propylene dibromide and the like. Especially preferred is ethylenedibromide.

The solvent in which the alkylation takes place is one inert to the reagents. It is usually an aromatic solvent capable of dissolving dihydroxydibenzanthrone and its derivatives, at least to some extent. It may be nitrobenzene or a chlorinated benzene such as dichlorobenzene or trichlorobenzene. Nitrobenzene is usually preferred.

The alkylation reaction takes place above 130° C.

and may run at temperatures over 200° C. up to the reflux temperature of the solvent.

The triethylamine catalyst is used in amounts of from 1–10% of the weight of the dihydroxydibenzanthrone solid in the reaction mixture. Preferably amounts of the order of about 5% are used.

The dihydroxydibenzanthrone used is preferably a wet press cake which is prepared for alkylation by the method of the cited Von patent. It may however be prepared for alkylation merely by azeotropic distillation of the water from the solvent slurry or it may even be previously dried and then dissolved in dry solvent. I prefer to use the pretreatment of the Von patent.

The acid binder used in the reaction mixture may be any alkali metal carbonate such as sodium carbonate, potassium carbonate, sodium bicarbonate, potassium bicarbonate, lithium carbonate, caesium carbonate and the like.

My invention may be illustrated by the following examples in which parts are by weight unless otherwise specified.

*Example 1*

A mixture of 462 g. of nitrobenzene and 43 g. of an aqueous dihydroxydibenzanthrone press cake containing 27 g. of real material is heated to 100° C. over a half hour period and then heated to 160° C. in the subsequent half hour period. After cooling to 80° C., 54 g. of ground anhydrous potassium carbonate is added and the mixture is then heated to 175° C. over about half hour and held at 175° C. for another half hour.

After cooling to 130° C., 80 g. of ethylene dibromide and 0.5 ml. of triethylamine are added. The mixture is stirred at 135–140° C. for 24 hours. A test at this point shows the absence of any unreacted dihydroxydibenzanthrone. The solid material is then isolated by filtration and washed with nitrobenzene.

It is slurried in 100 ml. water containing 1.5 g. of a dispersing agent (Tamol N). After being steam stripped to free it of nitrobenzene, the slurry is diluted to 650 ml. Then 22 g. of sodium hydroxide pellets and 28.5 g. of sodium hydrosulfite are added. The mixture is held at 60° C. for about 1½ hours. After filtering, the cake is washed with 700 ml. water at 60° C. containing 22 g. of sodium hydroxide and 28.5 g. of sodium hydrosulfite. The filtrate and washings are combined and aerated at 60° C. for 2 hours. The final dye is removed by filtration, washed and dried.

*Example 2*

The procedure of Example 1 is repeated except that no triethylamine is added with the ethylene dibromide.

Even after 48 hours' reaction at 130–135° C., unreacted dihydroxydibenzanthrone is still present. Then 40 g. more of ethylene dibromide is added and the mixture is stirred an additional 30 hours at 130–135° C. At this time a test indicates that there is still unreacted dihydroxydibenzanthrone present.

Upon isolation of the dye that has been formed it is found that the dye is of a considerably greener shade than that formed in Example 1.

An additional experiment, similar to the one above, except that the additional heating period is 48 hours instead of 30 hours, still contains unreacted dihydroxydibenzanthrone. The dye that is formed is considerably greener and duller than the dye formed in Example 1.

*Example 3*

The procedure of Example 1 is followed except that 1 ml. of triethylamine is added after the ethylene dibromide. This reaction, when tested, also shows completion after 20 hours and gives a dye of a desirable shade and brightness. A similar result is obtained when 2.5 ml. of triethylamine is added.

*Example 4*

Using triethylamine, as in Von's Patent No. 2,781,362, a press cake containing 27 parts real dihydroxydibenzanthrone is suspended in 462 parts of nitrobenzene and 13.8 parts of triethylamine is added. This slurry is then gradually heated to 160° C., whereupon water and some triethylamine and nitrobenzene distill off. The resulting mixture is then cooled to 80° C. and 54 parts of micromilled potassium carbonate is added. The mixture is then gradually heated to 175° C., whereupon any remaining water and all of the triethylamine are removed. The mixture is then cooled to 130° C. and 1 part of triethylamine and 60 parts of ethylene dibromide are added. The mixture is then heated to 135–140° C. until a test shows that the reaction is complete and that there is no unreacted dihydroxydibenzanthrone present, the reaction requiring about 8 hours. The mixture is cooled to room temperature and the solid product is removed by filtration and washed with nitrobenzene. An excellent quality of the dye is obtained. After further purification as in Example 1, a yield of 105 parts of dye of satisfactory hue and brighteners results.

I claim:
1. In the process of alkylating dihydroxydibenzanthrone with a lower alkylene dihalide by heating said dihydroxydibenzanthrone with said alkylene dihalide in the presence of an inert solvent to a temperature in the range of 130° C. to reflux and an alkali metal carbonate, the improvement of adding to the substantially anhydrous alkylation reaction mixture, as catalyst, triethylamine in the amount of from 1–10% of the weight of said dihydroxydibenzanthrone.
2. The process of claim 1 when the alkylene dihalide is ethylenedibromide.

References Cited in the file of this patent
UNITED STATES PATENTS

| | | |
|---|---|---|
| 2,042,414 | Sobatzki et al. | May 26, 1936 |
| 2,781,362 | Von | Feb. 12, 1957 |